United States Patent [19]

Davault

[11] Patent Number: 5,613,612
[45] Date of Patent: Mar. 25, 1997

[54] COMBINATION 3-D POP-UP DISPLAY AND CD HOLDER

[76] Inventor: Elaine J. Davault, 1999 S. Coast Hwy. #1, Laguna Beach, Calif. 92651

[21] Appl. No.: 610,436

[22] Filed: Mar. 4, 1996

Related U.S. Application Data

[63] Continuation-in-part of Ser. No. 404,620, Mar. 15, 1995, abandoned.

[51] Int. Cl.⁶ ................................................. B65D 65/30
[52] U.S. Cl. .................. 206/768; 206/308.1; 206/310; 40/539; 40/124.1
[58] Field of Search ................................ 206/232, 736, 206/307, 308.1, 309–313, 767, 768, 457, 459.5; 40/124.1, 539

[56] References Cited

U.S. PATENT DOCUMENTS 2,511,211  6/1950  Klein et al. .................... 206/45.15
2,884,738  5/1959  Lohnes et al. .................. 40/124.1
4,708,239  11/1987 Bourbon ........................... 220/338
4,709,812  12/1987 Kosterka .......................... 206/308.1
5,085,318  2/1992  Leverick ......................... 206/308.1
5,317,823  6/1994  Brunt, II ......................... 206/308.1

FOREIGN PATENT DOCUMENTS

9309103 U  9/1993  Germany.

*Primary Examiner*—Jimmy G. Foster
*Assistant Examiner*—Nhan T. Lam
*Attorney, Agent, or Firm*—James G. O'Neill

[57] ABSTRACT

A combination pre-recorded disc holder and display in which the display is removably held in the disc holder. The display incorporates three-dimensional elements held between a pair of panels that are opened and closed upon opening and closing the cover of the holder. In the open position, with the display held in the cover, a pre-recorded disc held in the holder may be removed and reinserted without interference from the display. The display may be easily removed from the holder for use elsewhere, and returned to the holder for storage or further use therein.

20 Claims, 3 Drawing Sheets

COMBINATION 3-D POP-UP DISPLAY AND CD HOLDER

CROSS REFERENCE TO RELATED APPLICATION

This is a Continuation-In-Part of application Ser. No. 08/404,620, now abandoned, filed Mar. 15, 1995.

BACKGROUND OF THE INVENTION

1. Field of the Invention

This invention relates generally to CD holders, and more particularly, to an improved combination 3-D pop-up display and CD holder.

2. Description of Related Art

With the ever increasing popularity and use of prerecorded discs, such as "compact discs" or "CDs" containing laser readable information for music, or CD ROMs containing information for games, or discs containing movies, many types of packaging and point of purchase ("POP") displays have been devised for attractively packaging such CDs and/or for attracting the attention of potential purchasers. For example, U.S. Pat. No. 5,307,927 to Curtis et al discloses a package for a compact disc formed from a prescored, preprinted unitary blank and at least one injection molded plastic compact disc holder, in which the front panel, for retail display purposes, is not folded over the panel containing the CD, but is instead left in an unfolded orientation, as an extension of the CD containing panel, and is held in that unfolded orientation by at least one clip.

Other known prior art, such as U.S. Pat. No. 5,251,750 to Gelardi et al discloses a CD tray incorporating a flat plane or surface for nesting a CD and a central rosette with a pop-up feature for capturing the center of a CD placed therein for aiding the insertion and release of the CD from the CD tray.

Additional known prior art such as U.S. Pat. Nos. 5,232,087 to Schluger; 5,154,284 to Starkey; 5,078,670 to Volkert; 4,623,325 to Mori et al; 4,433,780 to Ellis; 4,103,444 to Jones et al; and 3,855,726 to Yumoto, disclose various means for packaging and transmitting a disc, or means for making such packaging; or advertising leaflets, books, greeting cards or promotional items containing pop-up elements. Although this prior art provides improved features for various media, they do not provide a combination CD holder and display having three-dimensional elements that may be used in the CD holder, or removed therefrom for display elsewhere.

There is, therefore, a need in the art for a 3-D pop-up display that may be inserted and used in substantially any CD holder, and which may be easily removed therefrom for POP purposes, or for use by an end user.

SUMMARY OF THE INVENTION

It is a general object of the present invention to provide an improved CD holder. It is a more particular object of the present invention to provide an improved three-dimensional display for a CD holder. It is still a more particular object of the present invention to provide an improved combination CD holder and removable three-dimensional insert therefor. It is yet another particular object of the present invention to provide an improved 3-D pop-up display system which may be opened upon opening of the cover of a CD holder. It is a further particular object of the present invention to provide an improved 3-D pop-up display system which is opened upon opening of the cover of a CD holder and which also allows the CD held in the CD holder to be easily removed. It is yet a still more particular object of the present invention to provide a removable 3-D pop-up display for a CD holder. It is a still further particular object of the present invention to provide an improved 3-D pop-up insert for a CD holder which is removably held in the cover of the CD holder. It is yet a further particular object of the present invention to provide an improved 3-D pop-up insert for a CD holder which insert is removably held by a strip formed on a tray holding portion of the CD holder. And, it is a still further particular object of the present invention to provide an improved system comprising a CD holder having a three-dimensional insert that may be opened upon opening of the cover of the CD holder, and which allows easy access to the CD held within the holder when in the open position.

BRIEF DESCRIPTION OF THE DRAWINGS

The objects and features of the present invention, which are believed to be novel, are set forth with particularity in the appended claims. The present invention, both as to its organization and manner of operation, together with further objectives and advantages may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out her invention. Various modifications, however, will remain readily apparent to those skilled in the art, since the generic principles of the present invention have been defined herein specifically to describe an improved system comprised of a three-dimensional ("3D") pop-up display or insert for CD holders, which 3D display may have any desired use, such as a POP display, or as a card, or as a sculpture by an end user.

Figure 1:
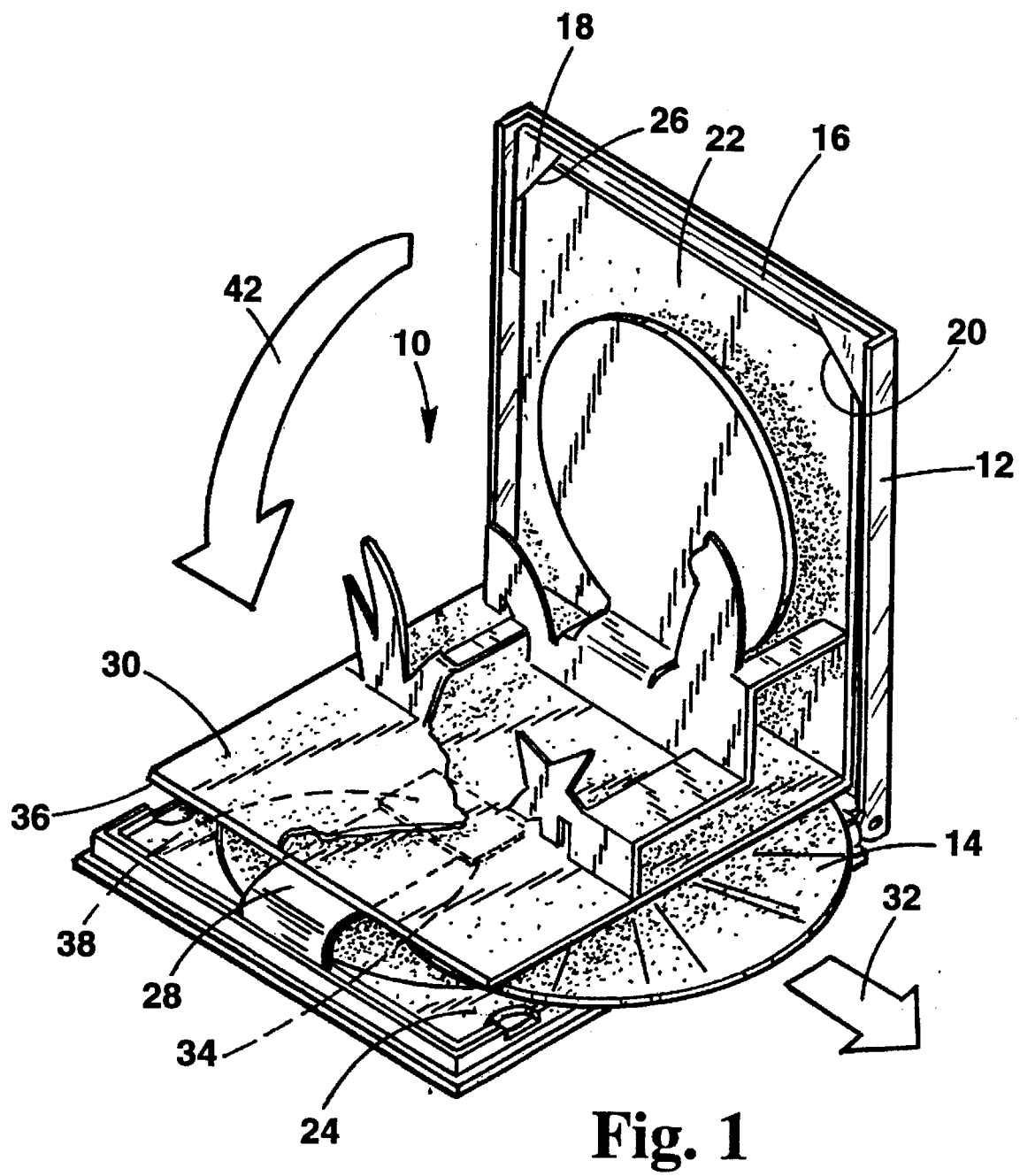
FIG. 1 is an isometric view of one embodiment of the improved CD holder and 3-D pop-up display of the present invention, showing how a CD may be inserted in or removed from the holder, with the pop-up display in its open position.

Referring now to the drawings, there shown in FIG. 1 is a preferred embodiment of the inventive system, including a 3D display or insert, generally indicated at 10, and constructed in accordance with the principles of the present invention. The 3D display 10 is removably held within a CD holder or cassette 12, of any known type, but which has been shown therein for reasons of explanation only, and not by way of limitation, as a type of readily available plastic cassette holder referred to a "jewel case" used, for example, to hold music CDs. A CD 14 is held within the holder 12 in a manner well know to those skilled in the art. And the holder 12 is provided with a top or cover portion, hingedly connected to a bottom or tray holding portion, in which the CD 14 is held.

Although the display or insert 10 of the present invention may be captured and held within the CD holder 12, or other CD holders, as explained more fully below, in a number of ways, one presently preferred manner consists of providing the CD holder 12 with a removable front cover 16, which is slidably held within the top cover. The front cover may contain any desired printed matter thereon, such as advertising, graphics, or the like on the front surface, and a list of the music or other information contained on the CD held within the holder, on the other or rear surface. In addition, to allow the display 10 to be removed from and/or inserted and held within the holder 12, the front cover 16 is provided with a further flap or portion 18, of any desired size and/or shape, secured to one end thereof. The flap 18 is provided with holding means 20, such as a pair of openings or slots formed therein. The slots are preferably formed at an angle to, and adjacent to, the sides of flap, not to far from the sides of the front cover 16. The outer corners of a panel or portion 22, of a pair of foldable or hinged panels 22, 30, secured along one edge, and which form display 10, may be inserted and held in slots 20, as shown in FIG. 1.

Furthermore, as is well known to those skilled in the art, the CD holder 12 is provided with a bottom holding tray 24, for holding the CD 14 therein, around a raised central portion or rosette 26. In addition, in accordance with one embodiment of the present invention, the bottom tray may be provided with an elongated holding strip 28, formed integrally with the tray, or secured thereto in any known manner. The strip 28 is preferably formed as a narrow flap-like element made from some type of resilient material, such as a cardboard or a plastic, having a memory. The resiliency of the strip allows it to act, when the CD holder 12 is opened, to hold or raise a second folding panel or portion 30 of the foldable display 10, above or away from the bottom tray 24 and CD 14. As shown in FIG. 1, the strip 28 is folded over or into the holder 12 and is of sufficient length and resiliency, so that upon opening of the cover of the holder 12 and pulling the first panel 22 away from second panel 30, the strip will raise or push the second panel 30 away from the tray holder and CD 14, so as to enable the CD to be removed from the tray, in the direction of arrow 32 shown in FIG. 1. The surface of the outer end of the strip 28, away from the CD holding tray 24, is provided with a releasable holding means 34, such as a pressure sensitive adhesive or tape, or a portion of Velcro. Addition-ally, a bottom or lower surface 36 of the second panel 30 is provided with a mating releasable holding means or portion 38. With the releasable holding means 34, 38 secured together, the bottom surface 36 and, therefore, the entire insert 10, will be releasably held in the CD holder 12.

The display or insert 10 of the present invention may be made in any known manner, and preferably has the two substantially equal panels 22, 30, with a plurality of foldable elements therebetween, of a type known to those skilled in the art and used in books, cards, sculptures, or the like, so as to provide a three-dimensional configuration, as shown in the drawings, when opened, and which fold together when the panels 22 and 30 are brought together or closed, as by the closing of the cover of holder 12, with the display 10 therein.

The front cover 16, insertable in the hinged top portion of the holder 12, is manufactured of any desired material so long as it has sufficient strength so that the flap 18 and plurality of slots 20 formed in the flap on the front cover, will not easily break or tear.

The CD holder 12 and tray 24 are manufactured in any manner well known to those skilled in the art, so that a CD 14 may be held therein by inserting it over the central raised portion 26.

Additionally, the resilient strip 28 with the releasable holding portion 34 thereon is manufactured so as to be secured to or formed integrally with the holding tray 24 when the tray is formed.

Figure 2:
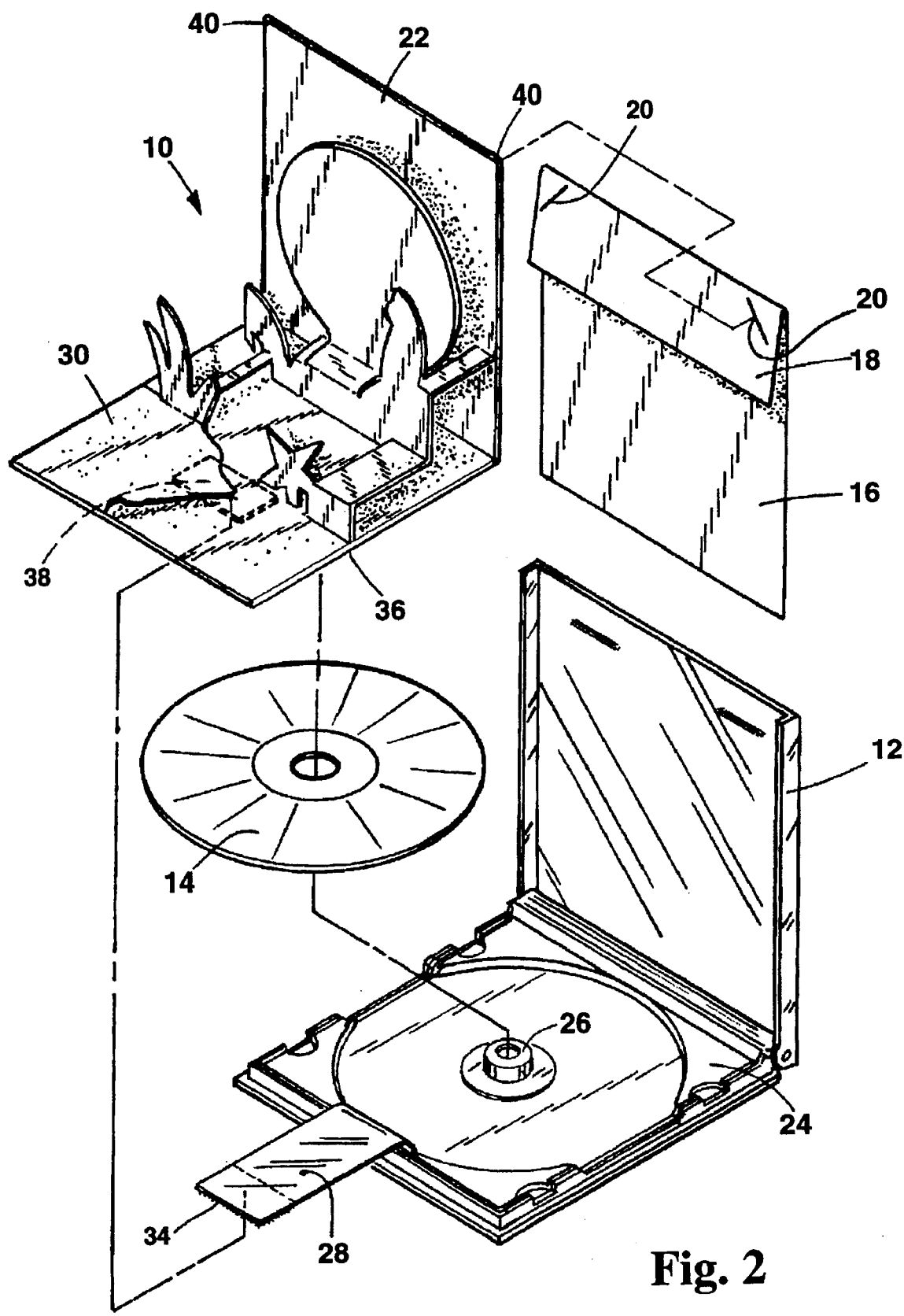
FIG. 2 is an exploded isometric view of the embodiment of the display and CD holder of FIG. 1.

Turning now to FIG. 2, to assemble the combination 3D display 10 and CD holder 12, a pair of corners 40 of the first panel 22 are inserted into the slots 20 in flap 18 of front cover 16, either before or after, the front cover 16 has been inserted or slid into the top cover of CD holder 12. Flap 28 should be, or is then folded over or into the CD holder, above tray 24, and the releasable holding means 34 is coupled or mated to the releasable holding means 38 on the lower surface 36 of the second panel 30. When completely assembled, these elements form a combination CD holder and 3D display, as shown in FIG. 1. The CD 14 may be easily inserted into or removed from the tray 24, with the display 10 in the position shown in FIG. 1.

For packing, shipping or storage, the CD holder 12 is closed by moving the top cover in the direction of arrow 42. This movement causes the panels 22 and 30 to be closed or folded together, thereby folding the 3-D elements forming the 3-D configuration together. If just manufactured, or to be sent elsewhere, the folded display 10 and holder 12 formed in accordance with the present invention, may be packaged or sealed, and mailed or shipped.

When received by a dealer, retailer, or other end user, one or more CD holders 12 may be opened to provide a CD holder with the eye catching three-dimensional display 10 therein, thereby eliminating the need for other POP ads. Or, if desired, the releasable holding means 34 and 38 may be taken apart and the corners 40 of panel 22 removed from the slots 20 so that the display 10 may be removed and used as a card, or a separate POP ad away from the CD holder 12. Additionally, after an end user purchases a packaged CD holder 12 having a display 10 therein, the end user may remove any protective wrapping around the CD holder and remove the CD 14 for use, or, as needed, remove the display 10, as described above, for use as a stand-alone card or sculpture. When no longer needed, the display 10 may be reinserted in the CD holder 12 with the CD 14 and stored for later use.

Figure 3:
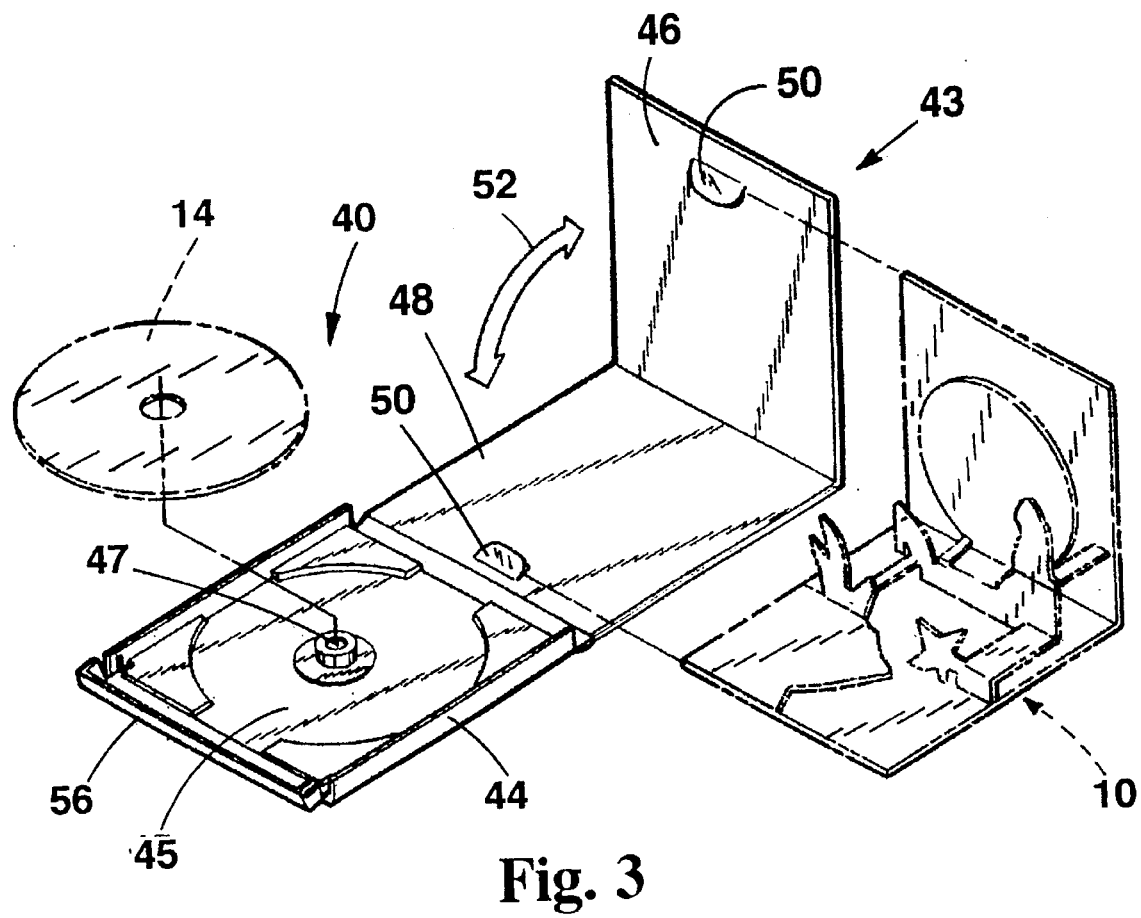
FIG. 3 is an isometric view of a further embodiment of the improved CD holder and 3-D pop-up display of the present invention, showing how the pop-up display may be inserted or removed with the cover of the CD holder in an open position.
Figure 4:
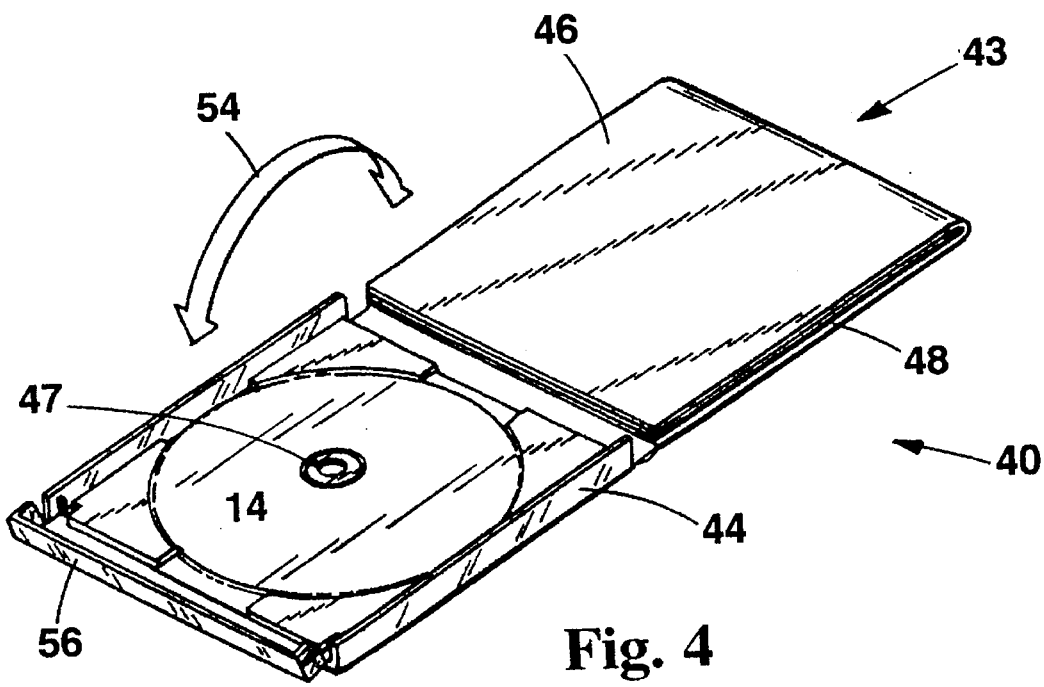
FIG. 4 is a further isometric view of the embodiment of the display and CD holder of FIG. 3, with the 3-D pop-up display shown folded into the cover of the CD holder.

As is best shown in FIGS. 3 and 4, a fur%her embodiment of the invention consists of providing a CD holder 40, sometimes referred to as a "Digipak" or an "FLP" CD holder, includes a multipaneled front cover 43, hingedly attached to a bottom CD holding portion 44, having a tray 45 into which the CD 14 may be inserted and held. The front cover 43 may be formed integrally with a lower part of the holding portion 44. That is, the bottom or a lower surface of the holding portion 44 and cover 43 may be formed from a single strip of material having a plurality of folded portions thereon. In this manner, the front cover has at least two portions 46, 48, hingedly held together along a common edge, and the display 10, shown in broken line in FIG. 3, may be easily inserted into and/or removed from between facing interior surfaces of these folding portions 46, 48. When inserted between the facing surfaces of folding cover portions 46, 48, the display 10 is held in place by flap or lip means 50 formed on the facing interior surfaces of each of the folding portions 46, 48. The lip means 50 are formed in any known manner, such as by die cutting a portion of the facing interior surfaces of each of the folding portions 46, 48 and raising the die cut flaps away from the surfaces. The display is inserted and securely held in the flaps 50 so that when the two portions 46, 48 are folded together, in the direction of the arrow 52 shown in FIG. 3, the display 10 will be also be folded, as shown in FIG. 4. And, on lifting apart the folded together portions 46, 48 of the cover 43, with the display 10 held in the lips 50, in the direction of arrow 52 shown in FIG. 3, the display will also be opened, and may be easily removed from the lips 50.

The CD holder 40, including the cover 43, with folding portions 46, 48, the bottom or holding portion 44, and tray 45 are manufactured in any manner known to those skilled in the art, using available materials, and are sized and dimensioned so as to facilitate easy insertion and/or removal of both the display 10 and the CD 14.

For packing, shipping or storage, of the CD holder 40, the top cover 43 is first closed by moving the cover portion 46 in the direction of arrow 52 shown in FIG. 3, so as to be against portion 48, as shown in FIG. 4. This closing movement of the cover portion 46 causes the panels 22 and 30 of the display 10, held in the lips 50, to be closed or folded together, thereby also folding the 3-D elements contained therein. The folded together cover 43, with the display 10 folded therebetween, is then closed or folded into bottom CD holding portion 44, in the direction of arrow 54, shown in FIG. 4. The cover 43 is then secured to the bottom CD holding portion 44 by the actuation of a holding bar or locking means 56, as is known to those skilled in the art. The CD holder 40 may be opened and display 10 removed by reversing the steps just described.

Those skilled in the art will appreciate that various adaptations and modifications of the just described preferred embodiments can be configured without departing from the scope and spirit of the invention. Therefore, it is to be understood, that, within the scope of the appended claims, the invention may be practiced other than is specifically described herein.

What is claimed is:

1. A combination pre-recorded disc holder and display device, comprising:

a disc holder having a bottom tray portion for carrying a pre-recorded disc and a cover portion, hingedly connected to said bottom tray portion to open and close said disc holder to enable said pre-recorded disc to be inserted in and removed from said bottom tray portion;

an easily removable display comprising two panels having front and rear surfaces hingedly connected together, with a plurality of pop-up elements secured between the front surfaces of each of said two panels and capable of folding together when said front surfaces of said two panels are brought together, and forming a three-dimensional configuration when said front surfaces of said two panels are moved apart; and securing means in said disc holder for removably securing said two panels of said easily removable display in said disc holder whereby said front surfaces of said two panels must be brought together to enable said top cover portion of said disc holder to be closed with respect to said bottom tray portion.

2. The device of claim 1 wherein said securing means for removably securing said two panels of said easily removable display in said disc holder comprise releasable securing means formed in said disc holder.

3. The device of claim 2, further including first and second releasable holding means formed on the rear surfaces of said two panels.

4. The device of claim 3, further including a front cover having a front face and a rear face held in said top cover portion, with at least one releasable holding means secured to said rear face of said front cover.

5. The device of claim 4, further including a holding strip having two sides and an open end in said disc holder, with a releasable holding portion secured to said open end of said holding strip on one of said two sides, whereby a selected one of said first and second releasable holding means formed on the rear surface of one of said two panels may removably mate with and hold said releasable holding portion.

6. The device of claim 5 wherein said holding strip is formed of a resilient material adjacent said bottom tray portion, and said holding strip acts to elevate one of said two panels connected thereto, away from said bottom tray portion, to enable said pre-recorded disc to be inserted into and removed from said bottom tray portion, when said top cover portion is in an open position.

7. The device of claim 6 wherein said easily removable display may be removed from said disc holder by releasing the mating releasable holding means and releasable holding portion, and releasing said at least one releasable securing means.

8. The device of claim 7 wherein there are two releasable securing means, one of which is comprised of two corners on one of said two panels, cooperating with two angled slots formed in said rear face of said front cover.

9. The device of claim 3 wherein said two panels are substantially equal in size; said bottom tray includes a holding strip having two sides and an open end, with the first releasable holding means secured to one of said two sides adjacent said open end and including means for mating with the first releasable holding means on the rear surface of one of the two equal size panels.

10. The device of claim 9 wherein said holding strip is formed of a resilient material which is bent into said disc holder so that said first releasable holding means thereon is positioned away from said bottom tray portion, with a first mating releasable holding means on said rear surface of one of said two substantially equal size panels releasably secured thereto in a position which is elevated away from said bottom tray portion by the action of said resilient material, when said top cover portion of said disc holder is in the open position, away from said bottom tray portion.

11. The device of claim 10 wherein said removable display may be removed from said disc holder by releasing the first mating releasable holding means from the first releasable holding means, and releasing a second releasable holding means from a second mating releasable securing means.

12. The device of claim 11, further including a front cover having a front face and a rear face forming said cover portion, and a flap secured to said rear face of said front cover at one end thereof and two slots formed in said flap for removably holding two corners of said first of said substantially equal panels.

13. The device of claim 1 wherein said cover portion includes a pair of folding portions having front and rear surfaces, and said easily removable display is held in said cover portion by first and second releasable holding means formed on the front surfaces of said pair of folding portions.

14. The device of claim 13 wherein said first and second releasable holding means are lips formed in said front surfaces of said pair of folding portions.

15. The device of claim 14 wherein said pair of folding portions must be first folded together before said cover portion may be closed over said bottom tray portion.

16. A pre-recorded disc holder, comprising, in combination:

a disc holding means comprising a bottom tray portion adapted to carry a pre-recorded disc, and a top cover portion hingedly connected to said bottom tray portion, for opening and closing said bottom tray portion;

said top cover portion having two separate folding portions;

a display having two substantially equal size panels hingedly connected together, releasably held in said disc holding means;

said two substantially equal size panels having front and rear surfaces with a plurality of pop-up elements secured between the front surfaces, said pop-up elements being folded together when said front surfaces are moved together and forming a three-dimensional configuration when said front surfaces are moved apart by the unfolding of said two separate folding portions; and each of said two separate folding portions having a holding means formed therein for holding said two substantially equal size panels.

17. The pre-recorded disc holder of claim 16, wherein said top cover portion is formed integrally with said bottom tray portion.

18. The pre-recorded disc holder of claim 16 further including a locking means on said pre-recorded disc holder for locking said top cover to said bottom tray portion, when said two separate folding portions are closed with said display therein, and said top cover portion is moved from an open to a closed position.

19. The pre-recorded disc holder of claim 16 wherein said holding means are separate lips formed in each of said two separate folding portions and said display is removed from said two separate folding portions by releasing said separate lips.

20. A combination pre-recorded disc holder and display device, comprising:

a pre-recorded disc holder having a bottom tray portion adapted to hold a pre-recorded disc, and a top cover portion hingedly connected to said bottom tray portion, said top cover portion movable between a closed position adjacent said bottom tray portion and an open portion, approximately 90 degrees away from said bottom tray portion;

a removable front cover, slidingly held in said top cover portion; said removable front cover having two ends, two sides, a front surface, and a rear surface;

a flap secured to one of said two ends adjacent said rear surface; said flap having two angled slots formed therein with one of said two angled slots being adjacent each of said two sides;

a display comprised of two substantially equal size panels, each of said substantially equal size panels having four side edges and front and rear surfaces; said two substantially equal size panels being hingedly connected together along one of said four side edges thereof;

a plurality of pop-up elements secured between the front surfaces of each of said two substantially equal size panels; said plurality of pop-up elements being folded together when said front surfaces are moved together and forming a three-dimensional configuration when said front surfaces are moved apart;

each of said two substantially equal size panels having a pair of corners formed by the meeting of two of said four side edges, away from side edges forming the hinged connection therebetween; a first of said two substantially equal size panels having its pair of corners releasably captured in said two angled slots in said flap;

a resilient holding strip having two ends secured to said bottom tray portion by one of said two ends so that said resilient holding strip is bent into said pre-recorded disc holder over said bottom tray portion; said resilient holding strip having two faces and a first releasable holding means secured to one of said two faces, adjacent the second of said two ends, away from said bottom tray portion; and said rear surface of a second of said two substantially equal size panels having a second releasable holding means secured thereto and removably mated to said first releasable holding means, whereby said display may be removed from said pre-recorded disc holder, and whereby said front surfaces of said two substantially equal panels, when secured in said pre-recorded disc holder, will be moved apart when said top cover portion is moved from said closed position to said open position, and said front surfaces of said two substantially equal panels will be moved together when said top cover portion is moved from said open position to said closed position.

* * * * *